United States Patent Office 3,423,343
Patented Jan. 21, 1969

3,423,343
FLAME RETARDANT POLYURETHANE MATERIALS
James C. Barnett, St. Louis, Mo., assignor to Monsanto Company, St. Louis, Mo., a corporation of Delaware
No Drawing. Continuation-in-part of application Ser. No. 420,453, Dec. 22, 1964. This application Dec. 7, 1965, Ser. No. 512,245
U.S. Cl. 260—2.5    11 Claims
Int. Cl. C08g 22/44, 3/28

ABSTRACT OF THE DISCLOSURE

A polyurethane is described containing a small but fire resistant imparting amount of a substantially water-insoluble ammonium polyphosphate.

---

This is a continuation-in-part of application Ser. No. 420,453, filed Dec. 22, 1964 now abandoned.

This invention relates to polyurethane materials having improved resistance to flame. More particularly, this invention relates to polyurethane polymers having incorporated therein a phosphorus and nitrogen containing flame retardant as well as to methods for their preparation and especially flexible and rigid polyurethane foam materials having incorporated therein a phosphorus and nitrogen containing flame retardant.

It is known to impart flame resistance to polyurethane materials by incorporating unreactive phosphorus and nitrogen containing compounds into a polyol-polyisocyanate reaction mixture. For example, ammonium orthophosphates, such as diammonium orthophosphate, have been used in polyurethane foams as fire-retardants but these materials have the disadvantage of, among other things, being water-soluble and thus susceptible to being leached out of the foam by water over a period of time, altering certain of the physical properties of the foam, such as compressive strength and closed cell content, and requiring relatively large amounts, that is, about 8 to 10 percent or more by weight of the total foam, in order to improve the fire resistance of the foam. Other examples of unreactive phosphorus and nitrogen containing compounds which can be used in polyurethane foams as a fire-retardant are the water-insoluble compounds containing N-P linkages, such as the melamine-$P_2O_5$ reaction product. Such compounds useful in polyurethane foams are described in U.S. Patent 3,134,742 and as discussed therein these compounds when used as the only fire-retardant additive do not improve the fire resistance of the foam and, therefore, require with their use a liquid phosphorus-containing polyol which possesses some degree of flame retardancy and which contains functional groups adapted to react with the isocyanate group in order to chemically combine the liquid phosphorus-containing polyol in the foam. As can be appreciated, therefore, a water-insoluble phosphorus and nitrogen containing composition which when incorporated in relatively small amounts in the polyurethane material imparts flame resistance thereto and does not alter the physical properties of the material to any appreciable degree would represent an advancement in this art.

It is, therefore, an object of this invention to provide polyurethane materials having improved resistance to flame.

It is another object of this invention to provide polyurethane polymers having incorporated therein an improved phosphorus and nitrogen containing flame retardant.

It is a further object of this invention to provide a process for preparing polyurethane polymers having incorporated therein an improved phosphorus and nitrogen containing flame retardant.

It is a still further object of this invention to provide a rigid polyurethane foam having incorporated therein an improved phosphorus and nitrogen containing flame retardant.

It is a still further object of this invention to provide a process for preparing rigid polyurethane foams having incorporated therein an improved phosphorus and nitrogen containing flame retardant.

These and other objects will become apparent from the following detailed description.

The phosphorus and nitrogen containing compounds which impart flame resistance to polyurethane materials are substantially water-insoluble ammonium polyphosphates, i.e., those compounds having P-O-P type linkages, and having the general formula:

$$H_{(r-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$. The average value of $n$ being greater than 10 is evidenced by the paper chromatography method [Karl-Kroupa, Anal. Chem., 28, 1091 (1956)], and the polymeric P-O-P type linkage is evidenced by n.m.r. spectra which indicates substantially no P-N-P type linkages and no ortho, pyro or short chain P-O-P type groups and by infra-red spectra which indicates P-O-P type linkages but does not indicate substantially any P-N type linkages.

These polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates of the instant invention is about 1, i.e., $$\frac{m+2}{n}$$

with $m=n$, when the polyphosphates are completely ammoniated, in some cases the molar ratio of ammoniacal nitrogen to phosphorus is less than 1 and it is intended that this invention pertains to those polymeric ammonium polyphosphates having a molar ratio of not less than about 0.7. In addition, when the polyphosphates of the instant invention are characterized herein as being substantially water-insoluble it is intended to mean that the solubility of a slurry of 10 grams of solids/100 cc. of water after 60 minutes at 25° C. is about 5 grams/100 cc. of water or less. Specifically, for purposes of the present invention an ammonium polyphosphate having a solubility of a specified value refers to the solubility value in grams per 100 cc. of water when 10 grams of said polyphosphate is slurried in 100 cc. of water for 60 minutes at 25° C.

The degree of polymerization of the substantially water-insoluble ammonium polyphosphates is difficut to determine since known methods for determining such are "so-called" solution methods, that is, they employ solution techniques for polymerization measurements. For example, as determined by the end group titration method [Van Wazer, Griffith and McCullough, Anal. Chem., 26, 1755 (1954)] after converting the ammonium polyphosphate to the acid form by ion exchange resins [Van Wazer and Holst, J. Am. Chem. Soc., 72, 639 (1950)], the average numerical value of $n$ is from about 20 to about 400, preferred from about 40 to about 400; whereas, as determined by the method of light scattering or viscosity correlations obtained from light scattering [Strauss and Wineman, J. Am. Chem. Soc., 80, 2366 (1958)] modified by use of the Zimm plot method [Stacey, "Light-Scattering in Physical Chemistry," Butterworths, London (1956)] the average weight value of $n$ is above about 500 and preferred from about 500 to about 100,000 with from about 1,000 to about 3,000 being especially preferred.

The term "ammoniacal nitrogen" refers to that nitrogen which is present in the form of ammonium ions and is capable of being removed by the hydrogen form of a strong cation exchange resin, i.e., the hydrogen form of a sulfonate polystyrene resin. The term "nonammoniacal nitrogen" or "nuclear nitrogen" refers to nitrogen incapable of being removed in the manner of true ammonium nitrogen.

The ammonium polyphosphates can be prepared exhibiting many different crystalline forms as evidenced by their X-ray diffraction patterns and, in general, any of such forms can be used (although Forms 1 and 2, infra, are preferred), as well as the noncrystalline or amorphous form. Crystalline forms illustrative of ammonium polyphosphates suitable for use include the following:

X-RAY DIFFRACTION DATA [1]

| Form 1 | | Form 2 | | Form 3 | | Form 4 | |
| --- | --- | --- | --- | --- | --- | --- | --- |
| Line [2] | d, A. | Line [2] | d, A. | Line [2] | d, A. | Line [2] | d, A. |
| 1 | 6.06 | 1 | 5.70 | 1 | 6.65 | 1 | 5.70 |
| 2 | 5.47 | 2 | 6.06 | 2 | 5.68 | 2 | 5.60 |
| 3 | 3.83 | 3 | 3.08 | 3 | 5.40 | 3 | 3.42 |
| 4 | 3.50 | 4 | 2.93 | 4 | 3.52 | 4 | 7.00 |
| 5 | 3.24 | 5 | 3.37 | 5 | 3.80 | 5 | 6.10 |

[1] CuK $\alpha$ Radiation.
[2] Five strongest lines in order of decreasing intensity.

In general, the ammonium polyphosphates can be used in any size which permits their admixture with the other components of the polyurethane material into a homogeneous mixture. In particular, ammonium polyphosphates having a particle size fine enough to pass through an 80 mesh screen (USSS) are preferred, with a particle size at least fine enough to pass through a 200 mesh screen being especially preferred.

The substantially water-insoluble ammonium polyphosphate flame-retardants of the present invention can be prepared by many and various methods such as the methods disclosed and described in co-pending application Ser. No. 301,918 filed Aug. 13, 1963 now abandoned and in copending application Ser. No. 420,459, filed Dec. 22, 1964. In general, a phosphate containing material, such as monoammonium orthophosphate, diammonium orthophosphate, condensed phosphoric acid, orthophosphoric acid and the like, is thermally condensed with an ammoniating and condensing agent such as urea, ammonium carbonate, biuret, sulfamide, sulfamic acid, ammonium sulfamate, guanyl urea, methyl urea formamide amino urea, 1-3-diamino urea, biurea and the like. In particular, for example, monoammonium orthoprosphate and urea can be thermally condensed to prepare substantially water-insoluble ammonium polyphosphates by heat treating a melt formed from substantially equimolar quantities at a temperature of about 250° C. for a period of about 3 hours.

Although the manner in which the ammonium polyphosphate functions, that is, as a reactant type flame retardant or an additive type flame retardant, is not fully understood, in theory at least it is believed to function as an additive type flame retardant but such can function as a reactant type flame retardant since possible reactant groups are present in the material which would allow the interaction of the ammonium polyphosphate, polyol and polyisocyanate. In any event, however, the ammonium polyphosphate exhibits a truly surprising and totally unexpected capability as a flame retardant for polyurethane materials.

According to the present invention a polyurethane material having improved resistance to flame may be prepared by incorporating into the reactant mixture used to prepare the polyurethane material a small but fire resistance imparting quantity of an ammonium polyphosphate, and allowing the reactive components of the mixture to polymerize to a polyurethane material. The fire-resistant polyurethane material may be prepared in accordance with this invention by combining (A) a polyol, (B) an organic polyisocyanate, (C) a catalyst, and (D) an ammonium polyphosphate, and allowing the resulting reactive components of the mixture to polymerize to form a polyurethane material containing the flame retardant of the present invention.

The ammonium polyphosphate is incorporated into the reactant mixture for making the polyurethane material in amounts sufficient to impart to the finished product the desired degree of flame resistance. Generally, amounts of ammonium polyphosphate sufficient to provide the finished polyurethane material with from about 0.1 percent to about 5 percent by weight of phosphorus based on the weight of the total composition are used. Amounts sufficient to provide the polyurethane material with from about 0.5 percent to about 3 percent phosphorus are usually adequate. If a polyurethane foam is being produced, there is combined with the polyol, polyisocyanate, catalyst or accelerator, and the ammonium polyphosphate reaction mixture, (E) a foaming agent or inflatant, and (F) a surfactant.

The ammonium polyphosphate fire-retardants of the present invention can be used in preparing flame-retardant polyurethane materials by being admixed with any one or more of the several components of the reactant composition involved in the making of the polyurethane material. All of the components, including the ammonium polyphosphate, may be mixed and the reactant components polymerized in one place or the ammonium polyphosphate component may be mixed with one or more of them, i.e., with the polyol, before delivering the resulting polyolammonium polyphosphate to mixture with the remaining components. The ammonium polyphosphate may be combined with the polyol and/or the polyisocyanate, or catalyst reactants in any of several ways. Each of the polyol, polyisocyanate, catalyst and ammonium polyphosphate materials may be metered and pumped and/or charged into a common mixing vessel, and then the resulting mixture may easily be moved to the polymerization site for use in molds, slab stock operations, etc. The ammonium polyphosphate may also be admixed with the polyol reactant before it is combined with the polyisocyanate reactant. It is also within the scope of the invention to mix the ammonium polyphosphate with the polyisocyanate before combining such mixture with the polyol reactant. However, if a catalyst, such as a tertiary amine, and the ammonium polyphosphate are mixed and allowed to stand at room temperature for substantial periods of time, reaction may occur. Hence, it is preferred to mix the polyol, polyisocyanate and/or catalyst and the ammonium polyphosphate components either simultaneously or to first mix the polyol and/or polyisocyanate with the ammonium polyphosphate and then combine this mixture with the catalyst. For example, it is sometimes advantageous to prepare a polyol-ammonium polyphosphate mix prior to combining all of the ingredients in making polyurethane rigid foam and in such a case it is preferred to use the ammonium polyphosphate in amounts of from about 5% to about 15% by weight of the mix.

The ammonium polyphosphates of the present invention can also be used with other fire-retardant ingredients such as other phosphorus-containing materials, either of the reactive or additive types, halogen-containing materials, antimony- and boron-containing compounds and inert inorganic reinforcing materials. Amounts of ammonium polyphosphate which are usually suitable for use with other fire-retardant ingredients are from about 10% to about 90%, by weight, of the total fire-retardant composition. For example, the ammonium polyphosphates of the present invention may be advantageously used with the bis (hydroxyalkyl) amino alkyl phosphonic acid diesters as described and disclosed in U.S. Patent 3,076,010 in amounts as hereinbefore set forth and especially such compounds which include diethyl N,N-di-ethanolamino methyl phosphonate, bis(beta chloroethyl) N,N-diethanol amino methyl phosphonate and the like.

In preparing polyurethane materials an organic polyol, including diols, polyols, and polyether, polyester, and polyesteramide polyols having hydrogen atoms that are reactive with isocyanates may be used. Generally these materials have molecular weights ranging from about 62 to about 5,000 and have from 2 to about 8 or 10 or more hydroxyl groups per molecule and weight percent hydroxyl contents ranging from about 0.5 to about 25%. Some have even higher hydroxyl content. They generally have hydroxyl numbers of from about 50 to as high as 500 or even 700. In the polyester-polyol type of reactant the acid number should be less than 10 and is usually as close to 0 as possible. These materials are referred to conveniently as the "polyol" reactant. The useful active hydrogen-containing polyols include the large family of adduct compounds which result when ethylene oxide, propylene oxide 1,2- and 2,3-butylene oxide, or other alkylene oxides are added to such active hydrogen compounds as glycols and polyols represented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base polyol or amine molecules referred to, depending upon the intended use of the polyurethane. For example, when a final polyurethane is desired which is flexible, more alkylene oxide should be used than for a more rigid polyurethane.

For example, a polyol for use in making flexible foams could be well represented by glycerine to which sufficient propylene oxide was added to give a final hydroxyl content of about 1.7%. Such a material would have a molecular weight of about 3,000 and have a molar ratio of glycerine to propylene oxide of about 1 glycerine to 50 propylene oxide. This technique of controlling rigidity or flexibility by selection of the polyol molecule and this subsequent amount of alkylene oxide added is well known to those in the art. The method of incorporating the ammonium polyphosphate as described herein is equally applicable to the various materials resulting from such described technology. In addition to the glycols and the like which can serve as a base polyol molecule for addition of the alkylene oxides and thus yield the "polyol" molecule for reaction with the polyisocyanate, a starting molecule can be used which contains primary and/or secondary amine groups which have hydrogen reactive toward alkylene oxides. Here also, the quantity of alkylene oxide added depends upon the intended use of the final polyurethane products. Again, for flexible products where more alkylene oxide would be used to produce polyols with lower hydroxyl content, say, from about 0.1% to 5% or 10%, than for more rigid polyurethanes where polyols having weight percent hydroxyl content of from about 10% to 15% or 20% are often used. Representative amines which may serve as active hydrogen-containing molecules for reaction with epoxides are those having from 1 to about 6 or more amino nitrogens, examples of which are ethylamine, ethylenediamine, diethylenetriamine, triethylenetetramine, tetrapropylenepentamine and other linear saturated aliphatic alkylene amines, the important requirement being the presence of at least two, and preferably more, say 3 to 8 or 10 active hydrogen sites to which the alkylene oxide may be added. The ammonium polyphosphates of the present invention may be beneficially used with these polyols also. It is also well known to use the hydroxyl bearing molecules which have been prepared by esterification type reactions from polyfunctional acids or anhydrides and polyfunctional alcohols as the active hydrogen compounds used in preparing polyurethane systems. These compounds are often called polyester polyols. The ammonium polyphosphates of the present invention can be used in these systems with good results. Typical acids used for making these polyester-polyols are maleic, phthalic, succinic, fumaric, tetrahydrophthalic, chlorendic and tetrachlorophthalic acids. Typical polyols are ethylene, propylene, butylene, diethylene and dipropylene glycols, and polyethylene, polypropylene glycols and glycerine, trimethylol propane, hexanetriol, pentaerythritol, sorbitol, and the like. Where available, the above mentioned acids may be used in the anhydride form if desired.

In making the polyester-polyols, any of the various polyfunctional acids or anhydrides or mixtures thereof are caused to react with any of the glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those in the art. This invention is not concerned with these techniques but rather with the use of these well known products along with the ammonium polyphosphates to provide reduced flammability in the final polyurethane product.

In the art and technology of making polyurethanes, it is also known to employ what are called prepolymer techniques. This is a technique wherein part of the reaction involved in making a polyurethane is carried out yielding a prepolymer of increased molecular weight and with either resultant end groups of hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. The ammonium polyphosphates of the present invention can be used advantageously in these systems also.

Broadly, any of the prior art polyesters, polyisocyanate modified-polyester prepolymers, polyesteramides, polyisocyanate-modified-polyesteramides, alkylene glycols, polyisocyanate-modified alkylene glycols, polyoxyalkylene glycols and polyisocyanate-modified-polyoxyalkylene glycols, etc., having free reactive hydrogens and especially hydroxyl groups may be employed for the production of the fire-resistant polyurethanes in accordance with this invention.

Polyols as exemplified above are reacted with organic polyisocyanates to prepare polyurethanes. Broadly, the term "polyisocyanate" as used herein, means any of the prior art polyisocyanates that have been or could be used to prepare polyurethanes. The term includes monomeric di- and polyisocyanates and prepolymers of polyols and polyisocyanates where the isocyanate groups are in excess so that there are free available isocyanate groups available to react with additional polyol when they are combined with the polyisocyanate to form the fire-resistant polyurethane polymer of this invention. The organic polyisocyanates useful for the production of the polyurethanes include ethylene di-isocyanate, ethylidene di-isocyanate, propylene-1,2-di-isocyanate, butylene-1,3-di-isocyanate, hexylene-1,6-di-isocyanate, cyclohexylene-1,2-di-isocyanate, and the arene polyisocyanates having from 2 to 3 isocyanate groups per molecule and from 1 to 3 phenylene rings as the only aromatic cyclic ring system such as m-phenylene di-isocyanate, 2,4-toluene di-isocyanate, 1,6-toluene di-isocyanate, 3,3'-dimethyl- as well as various other polyisocyanates such as 4,4'-biphenylene di-isocyanate, 3,3'-dimethoxy-4,4'-biphenylene di-isocyanate, 3,3'-diphenyl-4,4'-biphenylene di-isocyanate, 4,4'-biphenylene di-isocyanate, 3,3'-dichloro-4,4'-biphenylene di-isocyanate, triphenylmethane tri-isocyanate, 1,5-naphthalene di-isocyanate, and the like.

Useful catalyst, and/or initiator materials which may be used as the "catalyst" component include the tertiary amines either individually or in mixture like N-alkylmorpholines, and N,N-dialkylcyclohexylamines, where the alkyl groups are methyl, ethyl, propyl, butyl, etc., also triethylamine, tripropylamine, tributylamine, triamylamine, pyrodine, quinoline, dimethylpiperdine, dimethylhexahydroaniline, diethylhexahydroaniline, the reaction products of N,N'-diethylaminoethanol and phenyl isocyanate, esterimides, 1-methyl-4-(dimethylaminoethyl) piperazine, N-ethylethylenimine, N,N,N',N'-tetramethyl - 1,3-butanediamine, triethylamine, 2,4,6 - tri(dimethylaminomethyl) phenol, tetramethylguanidine, N-ethylmorpholine, 2-methylpyrazine, dimethylaniline, and nicotine; and metallic compounds including those of bismuth, lead, tin, titanium, iron, antimony, uranium, cadmium, cobalt, thorium, aluminum, mercury, zinc, nickel, carium, molybdenum, vanadium, copper, manganese, zirconium, etc., examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin o-phenylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadmium diethyl dithiophosphate, thorium nitrate, triphenylaluminum, nickelocene, etc. The catalyst component either as single compound or as a mixture may be used in conventional amounts, which usually ranges from about 0.05 to about 4 parts of catalyst per 100 parts of polyolisocyanate reactants by weight.

Polyurethanes are used in both the unfoamed and in the so called "foam" form. In general, a foamed polyurethane is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature and the composition can be made to foam even before any substantial reaction between the polyol and the polyisocyanate reactants has occurred or before any heat is evolved. This technique is sometimes called frothing. Useful blowing agents, i.e., foam inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, one of such being "Freon."

When blowing or foaming agents are incorporated into the reactant composition there may also be incorporated into the mixture various conventional foam stabilizers to control the cellular structure of the foamed polyurethane obtained. Used for this purpose are various surfactants including various silicone compounds and silicone oil mixtures, e.g., dimethylsiloxane and alkylsilane-polyoxyalkylene glycol copolymers sold under various names such as "Silicone L–520" and "Dow Corning 199," etc. For foaming or blowing polyurethane polymers there may be used from about 5 to about 50 parts by weight of blowing agent and about 0.1 to 3 parts of the foam stabilizing agent per 100 parts by weight of the polyol and polyisocyanate reactants.

While preparing the fire resistant polyurethanes in accordance with this invention, the ammonium polyphosphates may be added to a "1-shot" mixture of the polyol polyisocyanate, and catalyst ingredients before hardening. It may also be added to a prepolymer prepared from the active hydrogen compound and the polyisocyanate previous to or simultaneously with the activator mixture. The polyol and polyisocyanate reactants are usually in proportions sufficient to provide an NCO/OH ratio of about 1.05/1. Usually a small excess of isocyanate reactant is used to insure complete reaction. Thus, it is preferred to combine the polyisocyanate and polyol in proportions sufficient to provide an NCO/OH ratio of about 1.05/1 although the art is aware that strict adherence to this ratio is not essential. As an example, in flexible foams where the blowing is often accomplished using $CO_2$ which results from reaction of water with isocyanate, large excesses of isocyanate are often used. The reaction mixture thus obtained may be metered and pumped during the induction period to the polymerization site where it may be readily poured, sometimes into suitable molds, by use of conventional equipment. The hardened pieces or foams are rendered flame-retardant by the inclusion in the reaction composition mixture of an ammonium polyphosphate in quantities of from about 0.5% to about 20% by weight based on the total composition and preferably from about 1% to about 10%. The phosphorus contained in the resulting polyurethane material does not substantially impair its good physical properties.

The polyurethane materials obtained according to this invention may be used in any of the fields where polyurethane materials have previously been used. The flexible foamed phosphorus-containing polyurethanes of this invention may be used for seat cushions, upholstery, crash pads, etc. The rigid polyurethane foams are very useful in structural applications, for example, as insulation panels, and for other building purposes. Nonfoamed polyurethane materials of this invention are useful in the production of textile fibers and as resin bases in the manufacture of cureable coating compositions. They are also useful as impregnating adhesives in the fabrication of laminates for woods and other fibrous materials.

When the ammonium polyphosphates are incorporated into the polyurethane foam system in the manner described herein, the resulting polyurethane foam is a high-quality, flame-resistant foam particularly when the polyurethane foam is a rigid foam.

The following examples are presented to illustrate the invention, with parts and percentages by weight being used in the examples unless otherwise indicated.

EXAMPLE I

This example illustrates the preparatiton of a rigid polyurethane foam using amonium polyphosphate therein as the flame-retardant.

| Ingredient: | Parts |
|---|---|
| Methyl glucoside based polyol | 100.0 |
| Trichloromonofluoromethane | 35.0 |
| "Silicone Y-4316" [1] | 2.0 |
| Tetramethylbutane diamine | 1.5 |
| Ammonium polyphosphate [2] | 10.0 |
| Polyisocyanate "Mondur MR" [3] | 108.0 |

[1] "Silicone Y-4316" is a trademark name for a silicone foam stabilizer.
[2] Ammonium polyphosphate: Phosphorus weight percent, 30.2; solubility, 3.5; ammoniacal nitrogen to phosphorus molar ratio, ~.92 crystalline form 1.
[3] Polyisocyanate "Mondur MR", a polymethylene polyphenylisocyanate having an available NCO content of about 32% and a viscosity at 25° C. of 200±50 cps.
Note.—Percent phosphorus in foam—about 1.18.

For the above formulation, all of the components except the polyisocyanate were blended to a homegeneous mixture, and then the polyisocyanate was added and the mixture was blended thoroughly. The foaming characteristics were a cream time of about 32 seconds and a rise time of about 170 seconds after the mixture was poured into paper lined boxes.

The following Table 1 sets forth the physical characteristics of the rigid polyurethane foam formulated in this example:

TABLE 1

(1) Density, pcf. _____ 2.0
(2) Compressive strength, p.s.i. at yield:
    Parallel to rise _____ 34.7
    Perpendicular to rise _____ 12.2
    Parallel to rise at end of 2 weeks at 70°
      C.—100% R.H. _____ 29.2
(3) "K" factor _____ 0.12
(4) Closed cells, percent approximately corrected _____ 96

Table 1—Continued (5) Dimensional stability, percent volume change:
- 70° C.—100% R.H.:
  - 1 week ........................... 10
  - 2 weeks .......................... 11
- 100° C.—amb. R.H.:
  - 1 week ........................... 1
  - 2 weeks .......................... 1
- —40° C.—amb. R.H.:
  - 1 week ........................... 1
  - 2 weeks .......................... 1

Note.—Standard tests described by the following:
(a) Density—ASTM D–1622–59T
(b) Compressive strength—ASTM D–1621–59T
(c) "K" factor—(Heat line source)
(d) Cell size—Microscopic count
(e) Dimensional stability—ASTM D–2126–62T The following Table 2 sets forth the flame resistance of the rigid polyurethane foam containing ammonium polyphosphate (APP) formulated in this example as well as the flame resistance of a rigid polyurethane foam containing diammonium orthophosphate (DAP) as the fire-retardant prepared in a polyurethane formulation of this example and with amounts used, i.e., about 14 parts by weight, to give approximately the same weight percent of phosphorus in the foam, i.e., about 1.26.

TABLE 2

|  | APP | DAP |
|---|---|---|
| Flammability rating | S.E. | S.E. |
| Ave. length burned, in | 0.3 | 2.4 |
| After 2 weeks at 70° C., 100% R.H. rating | S.E. | Burn |
| Ave. length burned, in | 1.5 | 4.0 |
| After 2 weeks at 100° C., amb. R.H. rating | S.E. | Burn |
| Ave. length burned, in | 2.0 | 4.0 |

Note.—1. S.E.=self-extinguishing rating; 2. Standard Test described in ASTM D–1692–59T.

EXAMPLE II

This example illustrates the preparation of a rigid polyurethane foam using ammonium polyphosphate therein as the flame-retardant.

| Ingredient: | Parts |
|---|---|
| Sucrose based polyol | 100.0 |
| Trichloromonofluoro methane | 35.0 |
| "Silicone Y–4316" [1] | 2.0 |
| Tetramethylbutane diamine | 1.5 |
| Ammonium polyphosphate (percent P30.2) [2] | 10.0 |
| Polyisocyanate "Mondur MR" [3] | 102.0 |

[1] "Silicone Y–4316" is a trademark name for a silicone foam stabilizer.
[2] Ammonium polyphosphate: Phosphorus, weight percent, 30.2; solubility, 3.5; ammoniacal nitrogen to phosphorus molar ratio, ~.92; crystalline form 1.
[3] Polyisocyanate "Mondur MR", a polymethylene polyphenylisocyanate having an available NCO content of about 32% and a viscosity at 25° C. of 200±50 cps.
Note.—Percent phosphorus in foam—about 1.20.

For the above formulation, all of the components except the polyisocyanate were blended to a homogeneous mixture, and then the polyisocyanate was added and the mixture was blended thoroughly. The foaming characteristics were a cream time of about 35 seconds and a rise time of about 160 seconds after the mixture was poured into paper lined boxes.

The following Table 3 sets forth the physical characteristics of the rigid polyurethane foam formulated in this example:

TABLE 3

| (1) Density, pcf. | 2.3 |
|---|---|
| (2) Compressive strength, p.s.i. at yield: | |
| Parallel to rise | 35.1 |
| Perpendicular to rise | 13.5 |
| Parallel to rise at end of 2 weeks at 70° C.—100% R.H. | 28.0 |
| (3) "K" factor | 0.12 |
| (4) Closed cells, percent approximately corrected | 94 |

(5) Dimensional stability, percent volume change:
- 70° C.—100% R.H.:
  - 1 week ........................... 6
  - 2 weeks .......................... 5
- 100° C.—amb. R.H.:
  - 1 week ........................... 5
  - 2 weeks .......................... 4
- —40° C.—amb. R.H.:
  - 1 week ........................... <1
  - 2 weeks .......................... <1

Note.—Standard tests described by the following:
(a) Density—ASTM D–1622–59T
(b) Compressive strength—ASTM D–1621–59T
(c) "K" factor—(Heat line source)
(d) Cell size—Microscopic count
(e) Dimensional stability—ASTM D–2126–62T

EXAMPLE III

This example illustrates the preparation of a flexible polyurethane foam using ammonium polyphosphate therein as the flame-retardant.

A mixture is prepared containing about 120.0 gms. of a polyoxypropylene triol having a hydroxyl number of 56.3 and a molecular weight of about 3,000 (prepared from glycerine and propylene oxide), 12.0 g. of ammonium polyphosphate,[1] 0.06 g. of 1-methyl-4-(dimethylaminoethyl) piperazine, 0.36 g. of stannous octoate, 0.60 g. of N-methylmorpholine, 1.20 g. of a silicone surfactant ("L–520")[2] and 3.48 g. of distilled water. To this mixture there is added 53.7 g. of toluene diisocyanate which is used in an amount sufficient to react with the polyol. The mixture is stirred to homogeneity, and then poured into an aluminum foil lined container where foaming progresses. The resulting flexible polyurethane foam is a high quality material of reduced flammability.

EXAMPLE IV

This example illustrates the use of ammonium polyphosphate in polyurethane foam compositions in accordance with this invention at three different weight percent concentrations. In these three formulations the ammonium polyphosphate is used in amounts to provide 0.6, 0.75, and 1.0 weight percent of phosphorus in the final foam composition.

| Ingredient | 0.6% P, Wt. g. | 0.75% P, Wt. g. | 1.0% P, Wt. g. |
|---|---|---|---|
| Ammonium polyphosphate [1] | 12.9 | 16.1 | 21.5 |
| Propoxylated methyl glucoside | 155.2 | 152.4 | 144.7 |
| "Silicone L–520" [2] | 1.6 | 1.6 | 1.6 |
| "Freon 11" [3] | 48.5 | 48.5 | 48.5 |
| Stannous octoate | .5 | .5 | .5 |
| 1-methyl-4-(dimethylamino-ethyl) piperazine | 1.6 | 1.6 | 1.6 |
| "Polyisocyanate A" [4] | 190.4 | 189.2 | 188.5 |

[1] Ammonium polyphosphate; Phosphorus, weight percent, 31.2 Solubility, 2.0; Ammoniacal nitrogen to phosphorus molar ratio~1.9 Crystalline Form 2.
[2] "Silicone L–520", is a trademark name for an alkylsilane polyoxyalkylene polymer silicone oil foam stabilizer.
[3] "Freon 11", is a trademark for trichlorofluoromethane used as a flowing agent.
[4] "Polyisocyanate A", an unpurified isomeric mixture of methylenebisphenylisocyanates, some molecules containing 3 aromatic rings and 3 isocyanate groups for a total NCO content of about 32%.

All of the ingredients in each composition except the "polyisocyanate A" are blended to a homogeneous mixture and then the "polyisocyanate A" component is added and blended into the other ingredients, and then the resulting mixtures are poured into a prepared container and allowed to polymerize and rise. Each of these formulations gives a high quality fire-resistant rigid foam.

[1] Ammonium polyphosphate: Phosphorus, weight percent, 31.2; solubility, 2.0; ammoniacal nitrogen to phosphorus molar ratio, ~.9; crystalline form 2.
[2] "Silicone surfactant L–520" is a trademark name for an alkylsilanepolyoxyalkylene polymer silicone oil foam stabilizer.

EXAMPLE V

This example illustrates the preparation of fire-resistant polyurethane foams by the method of this invention in which the ammonium polyphosphate is blended with each of the following polyols in an amount sufficient to provide the final polyurethane with from about 0.6% to about 2.5% by weight of phosphorus therein.

| Polyol | Percent OH of Polyol | Wt. percent P provided by Ammonium Polyphosphate |
| --- | --- | --- |
| Methyl glucoside and propylene oxide | 13.2 | 0.6, 0.9, 1.0, 1.2, 1.3, 1.5, 1.7, 2.5. |
| Sorbitol and propylene oxide | 14.7 | 1.1, 1.7. |
| Sucrose and propylene oxide | 12.7 | 1.1, 1.7. |

Each of the above starting polyols, methyl glucoside, sorbitol, and sucrose is reacted with sufficient propylene oxide to obtain the stated percent hydroxyl. To the ammonium polyphosphate [1] and polyol blend of about 170 grams are admixed a homogeneous mixture of about 1.6 grams of "Silicone L-520," [2] about 48.5 grams of "Freon-11," [3] about 0.5 gram of stannous octoate, about 1.6 grams of 1-methyl-4-(dimethyl aminoethyl) piperazine and about 190 grams of "polyisocyanate A" [4] and this mixture is poured into a prepared container and allowed to polymerize and rise. Each of these formulations gives a high quality fire-resistant foam.

EXAMPLE VI

This example illustrates the preparation of a rigid polyurethane foam using, as fire-retardant additive, a bis (hydroxylalkyl) amino alkyl phosphonic acid diester and an ammonium polyphosphate.

| Ingredient: | Parts |
| --- | --- |
| Methyl glucoside based polyol | 100.0 |
| Trichloromonofluoro methane | 35.0 |
| "Silicone Y-4316" [1] | 2.0 |
| Tetramethyl butane diamine | 1.5 |
| Ammonium polyphosphate [2] | 5.0 |
| Diethyl N,N diethanol aminomethylphosphonate | 5.0 |
| Polyisocyanate "Mondur MR" [3] | 108.0 |

[1] "Silicone Y-4316" is a trademark name for a silicone foam stabilizer.
[2] Ammonium polyphosphate: Phosphorus, weight percent, 30.2; solubility, 3.5; ammoniacal nitrogen to phosphorus molar ratio, ~.92; crystalline form 1.
[3] Polyisocyanate "Mondur MR," a polymethylene polyphenyl isocyanate having an available NCO content of about 32% and a viscosity at 25° C. of 200±50 cps.

For the above formulation, all of the components except the polyisocyanate are blended to a homogeneous mixture, and then the polyisocyanate is added and the mixture is blended thoroughly. When using a cream time of about 35 seconds, the mixture will have a rise time of about 170 seconds after the mixture is poured into a suitable mold. The above formulation gives a high quality fire-resistant rigid foam.

What is claimed is:

1. A mix useful in forming a fire resistant polyurethane rigid foam when incorporated with an organic polyisocyanate, a catalyst selected from the group consisting of tertiary amines and multivalent metallic compounds, a foaming agent selected from the group consisting of water, chlorinated and fluorinated alkanes containing from 1 to about 2 carbons and mixtures thereof and a silicone surfactant, comprising in admixture, a polyol and a substantially water-insoluble ammonium polyphosphate having the general formula $$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$; said ammonium polyphosphate being present in amounts from about 5 to about 15 weight percent of said admixture.

2. The mix of claim 1, wherein the average value of $n$ of said ammonium polyphosphate is from about 20 to about 400 as determined by the end group titration method.

3. A fire resistant polyurethane containing at least about 0.1 percent by weight of phosphorus based on the total weight of the composition of a substantially water-insoluble ammonium polyphosphate having the general formula:

$$H_{(n-m)+2}(NH_4)_m P_n O_{3n+1}$$

where $n$ is an integer having an average value greater than 10 and $m/n$ is between about 0.7 and about 1.1 and the maximum value of $m$ is equal to $n+2$.

4. The fire resistant polyurethane of claim 3, wherein the average value of $n$ of said ammonium polyphosphate is from about 20 to about 400 as determined by the end group titration method.

5. The polyurethane of claim 3, wherein said polyurethane is a foam.

6. The polyurethane of claim 4, wherein said polyurethane is a foam.

7. The polyurethane of claim 5, wherein said polyurethane is a rigid foam.

8. The fire resistant polyurethane rigid foam of claim 7, wherein said amounts are amounts sufficient to provide said foam with from about 0.5 percent to about 3 percent by weight of phosphorus.

9. The fire resistant polyurethane rigid foam of claim 8, wherein the average value of $n$ of said ammonium polyphosphate is from about 20 to about 400 as determined by the end group titration method.

10. A fire resistant polyurethane rigid foam containing, as fire retardant additives in an amount of at least about 0.1 percent by weight of phosphorus based on the total weight of said foam, a bis(hydroxyalkyl) amino alkyl phosphonic acid diester and a water-insoluble ammonium poly-phosphate having the general formula $$H_{(n-m)+2}(NH_4)_m P_n O_{3n+1}$$

wherein $n$ is an integer having an average value greater than 10 and $m/n$ is between about 0.7 and about 1.1 and the maximum value of $m$ is equal to $n+2$, said ammonium polyphosphate being present in amounts of from about 10 to about 90 weight percent of said fire retardant additives.

11. The polyurethane rigid foam of claim 10, wherein said average value of $n$ of said ammonium polyphosphates is from about 20 to about 400 as determined by the end group titration method.

References Cited

UNITED STATES PATENTS

| 3,208,959 | 9/1965 | Gmitter | 260—2.5 |
| 3,134,742 | 5/1964 | Wismer et al. | 260—2.5 |

DONALD E. CZAJA, Primary Examiner.

M. I. MARQUIS, Assistant Examiner.

U.S. Cl. X.R.

260—45.9, 77.5, 18

---

[1] Ammonium polyphosphate: Phosphorus, weight percent, 30.2; solubility, 4.7; ammoniacal nitrogen to phosphorus molar ratio, ~.9; crystalline form 1.
[2] "Silicone L-520" is a trademark name for alkylsilane-polyoxyalkylene polymer silicone oil foam stabilizer.
[3] "Freon-11" is a trademark for trichlorofluoromethane used as a blowing agent.
[4] "Polyisocyanate A," an unpurified isomeric mixture of methylenebisphenylisocyanates, some molecules containing 3 aromatic rings and 3 isocyanate groups for a total NCO content of about 32%.

PO-1050
(5/69)

UNITED STATES PATENT OFFICE
CERTIFICATE OF CORRECTION

Patent No. 3,423,343  Dated January 21, 1969

Inventor(s) James C. Barnett

It is certified that error appears in the above-identified patent and that said Letters Patent are hereby corrected as shown below:

Column 2, line 16, the beginning of formula reading "$H_{(r-m)+2}$" should read --$H_{(n-m)+2}$--.

Column 3, line 3, the figure "3,000" should read -- 30,000 --.
Column 10, line 56, the number "1.9" should read -- .9 --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents